(No Model.)

R. M. HUNTER.
ELECTRICAL TRANSMISSION OF ENERGY.

No. 596,041. Patented Dec. 21, 1897.

Attest
Wm. L. Evans
R. M. Kelly.

Inventor
R. M. Hunter

UNITED STATES PATENT OFFICE.

RUDOLPH M. HUNTER, OF PHILADELPHIA, PENNSYLVANIA, ASSIGNOR TO GEORGE W. K. STEPHENS, OF SAME PLACE.

ELECTRICAL TRANSMISSION OF ENERGY.

SPECIFICATION forming part of Letters Patent No. 596,041, dated December 21, 1897.

Original application filed February 23, 1883, Serial No. 85,897. Divided and this application filed October 4, 1889. Serial No. 325,958. (No model.)

*To all whom it may concern:*

Be it known that I, RUDOLPH M. HUNTER, of Philadelphia, in the county of Philadelphia and State of Pennsylvania, have invented an Improvement in Circuits Adapted to Electrical Transmission of Energy, all of which is set out in the following specification and shown in the accompanying drawings, which form a part thereof.

This application (Case No. 111) is a division of my application filed February 23, 1883, and serially numbered 85,897.

My object is to provide an improved system for transmitting electrical currents which require to be sent from one station to another and converted for use into currents of different tension by the employment of induction-coils. I contemplate transmitting strong currents whose tension shall be varied in accordance with the action of a transmitter, and the rise and fall of said currents in the line be utilized to operate at a distant station, by conversion, a translating device in the form, for instance, of an electromagnet.

My object is also to provide a line-circuit with a source of electric energy, combined with means for varying the current flowing over the line, so that it shall be made to alternately increase and decrease in potential and thereby be in condition for actuating at a distant station a translating device in a local or other circuit by the employment, at said distant station, of an induction-coil, the coarse wire of which is in the local circuit and fine wire in the line. By this means I am enabled to transmit over the line a current of varying potential and of comparatively high tension and having its current of an alternately rising and descending or increasing and decreasing potential, and employ at a distant station such currents to induce in a local circuit a current of low potential and greater volume which may be utilized to energize some translating device in the local circuit.

Figure 1:
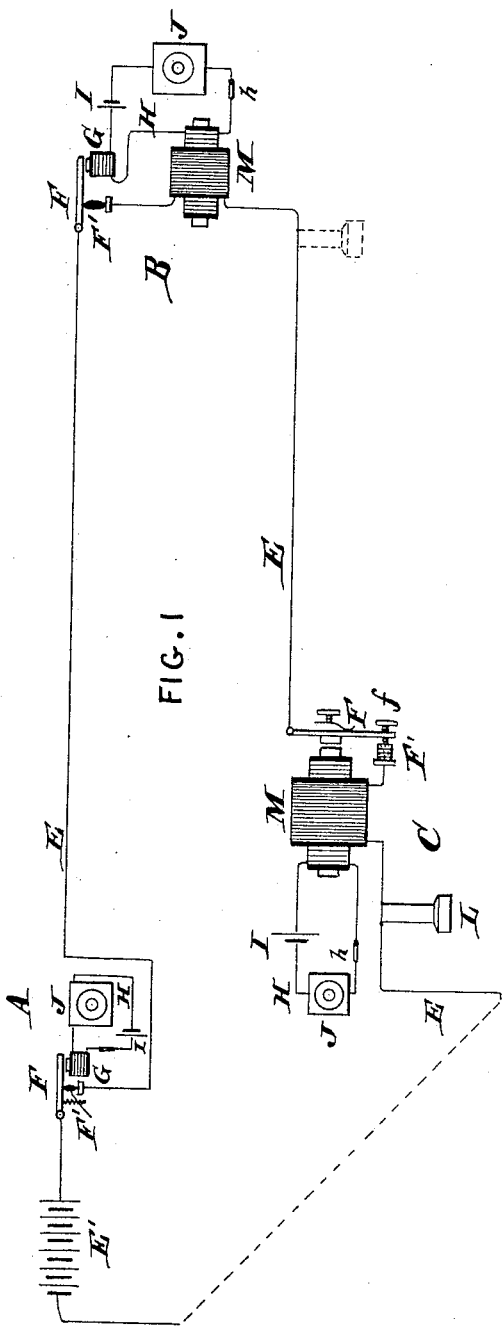
Figure 2:
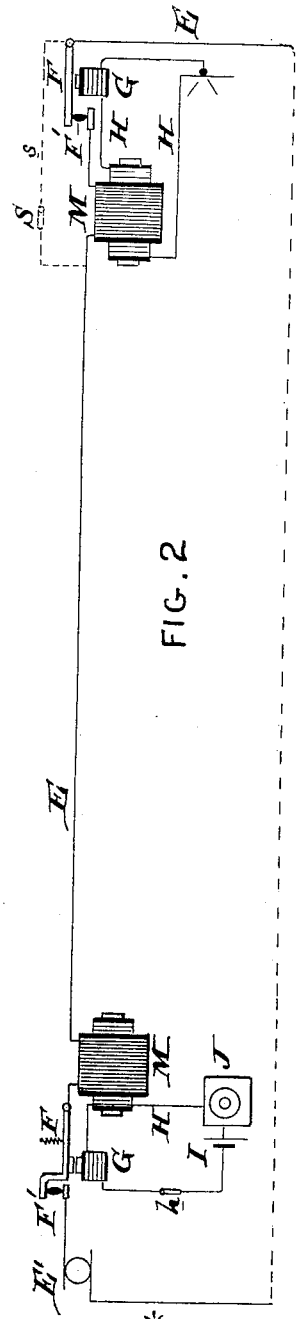

In the drawings, Figure 1 is a diagram, illustrating a line-circuit and series of stations thereon, showing arrangements of apparatus embodying my invention; and Fig. 2 is a diagram similar to Fig. 1, showing a simple form of the apparatus illustrated in Fig. 1.

In carrying out my invention I provide at one end of the line a source of energy maintained in any well-known manner by battery or dynamo, and this energy I cause to continually flow over the line when working, but with its potential constantly varying—that is to say, alternately increasing and decreasing in potential. This current may be augmented or not, as desired, by means of an induced current of corresponding variations. The line-current is then at the distant station caused to pass through the fine-wire coil of an induction-coil and thereby induce in a local circuit and coarse wire of the induction-coil a corresponding varying current, but of lower potential. This lower-potential current is employed to energize a translating device, and in this instance energizes an electromagnet which actuates a variable resistance and increases thereby the difference of the potential in the line.

Various translating devices may be employed in the local circuit.

I will now proceed to describe one specific form of my invention as applied to telephonic apparatus.

A, B, and C represent three stations on a line-circuit E, provided at one end with a line-battery or other electric generator E'. The transmitting apparatus may be arranged, as shown, at either of said stations. That shown at A has a lever F, resting on a rod or plate of carbon or other equivalent substance F', adapted to vary the resistance offered to the passage of a current of electricity upon any variation of the pressure of the armature. This carbon rod or plate F' is in circuit with the line, as shown, the current passing through said resistance. This armature F is actuated by an electromagnet G in the local circuit H, in which are arranged the local battery I and the transmitter J, the said circuit being provided with a switch *h*. This is the simplest arrangement of the circuit, and may be described as being operated as follows: The switch *h* being closed and the transmitter J being put into action, the armature F is caused to vibrate in accordance with the articulations, and this in turn varies the resistance offered by the carbon F' to the line-current which passes from main or line generator E' over line E. From this it is seen that when the transmitter is being actuated the arrangement above described causes undulatory currents of electricity to pass over said line and which in turn actuate the receiving-telephone L.

The resistance F' may be of carbon or of any other suitable material having the same property of converting uniform electrical currents into currents having alternating increasing and decreasing potential when the said resistance is subjected to varying pressures. By the lever F being made comparatively long and the magnet G powerful a great variation in the resistance may be obtained.

The carbon F' may be a simple block or rod interposed between two metal surfaces or a pencil of carbon may rest upon a block of carbon, as shown in Fig. 1 at station B, in which case it would act similar to the microphone, and, if desired, there may be a series of carbon pieces resting one upon the other.

Station B is somewhat more complex. It shows a local battery I arranged in the local circuit H, which includes the coarse wire of the induction-coil M, a transmitter J, and the magnet G for operating the resistance-changer F F'. A switch $h$ may be used to open or close the circuit H. The resistance-changer F F' consists of the carbon blocks F' and lever F for magnet G, as before. The line includes the fine wire of the induction-coil M in series.

Station C is slightly more complex, owing to the induction-coil being arranged therein acting as the resistance-changer magnet. In this case the fine wire of the induction-coil M is in the line-circuit E, and the coarse wire is in circuit with the local circuit H. The resistance-changing armature F is operated by the induction-coil in place of a separate magnet G. L is a telephone-receiver and is in the line E. Otherwise the apparatus at station C is the same as at station B. A set-screw $f$ may be employed to adjust the tension or pressure upon the carbon F'. The return-circuit may be the ground, as shown in dotted lines. The construction of parts F M at station C of Fig. 1 is equivalent to putting a secondary coil around electromagnet G and arranging it in circuit with the line.

In the diagram Fig. 2 we have the same parts as set out in the other figures, but simplified to two stations, from one of which the currents of alternate increasing and decreasing potential are transmitted and at the other end of which the said currents are utilized and conversion made to take place. In this figure the current from the generator or battery E' passes through the resistance-changer F' F and then through line E to the fine wire of the induction-coil M of the distant station. From there it passes through the resistance-changer F F' to ground and back to the generator E'. The transmitter J at the station to the left is in the local circuit H, having a battery I, and said circuit includes the primary or coarse wire of the induction-coil M and the electromagnet G for the resistance-changer. The secondary or fine-wire coil of the induction-coil is in the line-circuit. At the distant station the line-circuit includes the fine wire of the induction-coil M, while the coarse wire of the coil includes a local circuit H, which may have one or more translating devices in its circuit. For instance, this local circuit H includes the electromagnet G for operating the resistance-changer F F'. It will be seen that the current sent over the line E from the generator E' is by the operation of the resistance-changer converted into currents of alternately increasing and decreasing potential, and these currents passing through the induction-coil at the distant station induce in the local circuit corresponding impulses or currents, but of lower tension. This local current energizes the magnet G. The energizing of the magnet G actuates the resistance-changer F F' and augments the currents flowing in the line, greatly increasing the inductive effect and hence the current set up in the local circuit.

It is evident that the receiver L may be placed either in the line E or in the local circuits H, as desired.

The local shunt-circuit $s$ may extend around the local apparatus to cut it out of circuit, and this shunt-circuit is provided with a switch S.

I do not confine myself to the particular constructions set out, as they may be modified in various ways without departing from the spirit of the invention. The variations in the potential in the line may be increased or decreased, according to the action of the transmitter, and by operating the transmitter with a constant sound the variations in the line are uniform.

Having now described my invention, what I claim as new, and desire to secure by Letters Patent, is—

1. The combination with means to produce and maintain a continuous current and means to convert it into high-tension currents of alternately rising and falling potential, of a conductor for conveying said currents, an induction-coil having its fine wire in circuit with the line, a local circuit permanently closed when working including the coarse wire of the induction-coil, and a translating device in said local circuit.

2. A line conductor conveying high-tension currents, of alternately rising and falling potential, a variable resistance in the line-circuit, an induction-coil having its fine wire in circuit with the line, a local circuit including the coarse wire of the induction-coil, and a translating device in said local circuit, consisting of an electromagnet to vary said variable resistance.

3. The combination with a source of electricity of one sign and means to convert it into currents of alternately-varying potential, of a line conductor extending between two distantly-located stations and conveying said currents of electricity of alternately-varying potential, an induction-coil at the distant station having its fine wire in circuit with the line, a local circuit permanently closed when working in circuit with the coarse wire of said induction-coil and having generated therein currents of lower potential and greater volume as compared with the currents in the line, but having the same relative variation in potential, and an electromagnetic translating device in said local circuit.

4. A main electric generator or source of supply, and means operating without interrupting the current to vary the potential of the current generated and cause it to alternately rise and fall in potential, a line conductor for conveying said varying-potential current to a distant station, an induction-coil at said distant station having its fine wire in circuit with the line conductor, and a permanently-closed local circuit including the coarse wire of the induction-coil.

5. A line conductor conveying currents of alternately increasing and decreasing potential, a series of local circuits, and corresponding induction-coils each of which has its fine-wire coil energized by the current in the same line conductor, and separate local circuits each connected with the coarse-wire coil of the corresponding induction-coil.

6. The combination of a source of positive electric current, means for transforming said current without interrupting the continuity into a current having an alternately increasing and decreasing potential, a line conductor to convey said alternately increasing and decreasing potential current to a distance, a local circuit permanently closed upon itself when in operation and having a translating device therein, and an induction-coil having its coarse wire in circuit with the local circuit and its fine wire in circuit with the line conductor.

7. The method of transmitting electrical energy consisting in transmitting an electric current of high tension and small volume over a line-circuit and at one or more places on the line-circuit, producing by means of induction-currents of low tension and relatively large volume, and supplying said low-tension currents to one or more translating devices in said local circuits.

In testimony of which invention I have hereunto set my hand.

RUDOLPH M. HUNTER.

Witnesses:
ERNEST HOWARD HUNTER,
C. S. CHAMPION.